United States Patent

[11] 3,620,193

| [72] | Inventor | Alberto German Frers |
| | | Cabildo St. 88, Buenos Aires, Argentina |
| [21] | Appl. No. | 876,843 |
| [22] | Filed | Nov. 14, 1969 |
| [45] | Patented | Nov. 16, 1971 |
| [32] | Priority | July 11, 1969 |
| [33] | | Argentina |
| [31] | | 222,748 |

[54] CAGES FOR HOUSING AND FATTENING POULTRY
5 Claims, 2 Drawing Figs.

[52] U.S. Cl. ............................................. 119/18
[51] Int. Cl. ....................................... A01k 39/00, A01k 31/18
[50] Field of Search ............................ 119/17, 18, 22, 26, 28, 51, 33, 31

[56] References Cited
UNITED STATES PATENTS

| 1,813,847 | 7/1931 | Gorsuch | 119/18 |
| 1,986,501 | 1/1935 | Conway et al. | 119/33 |
| 2,031,874 | 2/1936 | Butler et al. | 119/18 |
| 2,601,844 | 7/1952 | Lovell | 119/22 |
| 2,661,800 | 12/1953 | Reichenbach | 119/18 |
| 2,698,004 | 12/1954 | Luther | 119/18 X |
| 2,756,720 | 7/1956 | Richmond et al. | 119/26 |
| 3,042,000 | 7/1962 | McMurray et al. | 119/20 |
| 3,110,286 | 11/1963 | Clute | 119/22 |
| 3,119,373 | 1/1964 | Schmid | 119/28 |
| 3,225,738 | 12/1965 | Palencia | 119/17 |
| 3,274,973 | 9/1966 | Woods et al. | 119/22 |

Primary Examiner—Aldrich F. Medbery
Attorney—Blum, Moscovitz, Friedman & Kaplan

ABSTRACT: Cages for housing and fattening poultry are disclosed wherein the front wall consists at least in part of an openable and replaceable door. The door has mounted on its exterior a feed receptacle and has therein openings suitable for passage of a fowl head and neck reaching toward a feed receptacle. The door has mounted on its inner surface between adjacent pairs of holes partitions thereby dividing the space adjacent to the door into stalls each of which can receive an individual fowl. Light enters the cage only through the openings in the front wall. A door having openings and partitions suitable for a bird of one size can be replaced with another door having openings and partitions suitable for poultry of another size.

PATENTED NOV 16 1971 3,620,193

CAGES FOR HOUSING AND FATTENING POULTRY

DISCLOSURE OF THE INVENTION

The purpose of grouped feeding troughs is utilized to take advantage of the phenomena that the maintenance of the birds in the dark will keep them quiet and prevents them from disturbing one another. At the same time, by the utilization of an arrangement of small windows facing the pens, each adapted for accommodating only one bird, the pens being disposed so that thereunder are provided troughs for food.

In this manner, stacking at feeding is prevented as the respective birds are compelled to feed separately, in substantially individual penned troughs, thereby practically entirely eliminating all possibility of aggression among them. The birds are able to eat quietly until they are satisfied and then begin to feel the need to rest. In addition, an attractive warm indoors, heat and light ambient entices them to sleep in the best conditions for comfort.

The above-mentioned individual feed troughs are complemented by drinking troughs also facing small windows, which provide the initial elements to attract the attention of the birds in order to initiate the process of feeding. As generally occurs in animal feeding, be it instinctive or by the sense of smell or by the peculiar noise of the water, the birds from the very first look for drinking water and later direct their activities to the food.

The small windows of the feeding troughs, as well as those of the drinking troughs are of minimal dimensions in order that minimal light enters the enclosures so as to maintain keeping the birds in a penumbra of close to darkness. For this purpose those windows should be of minimal dimensions essentially allowing the birds to only introduce their heads therethrough to eat or to drink. In fact, while the birds are eating or drinking, they themselves will block up the light, thus aiding the maintenance of the dark indoors ambient as to light.

The aforesaid arrangement shows other characteristics which establish a construction providing tactful handling of the birds as well as to maintain desired conditions of cleanliness and in relation thereto provide improved procedures to draw off the droppings which may, subject to ulterior treatment, be utilized for other applications.

The main features of the battery of troughs thus described which constitutes the main purpose of the present invention are better understood in the following preferred example, explained in the annexed illustration, and it should be understood that, as it is an example, it is not to be construed as a limited embodiment in respect to the extent of the protection of the invention, but merely an illustrative character of same.

Figure 1:
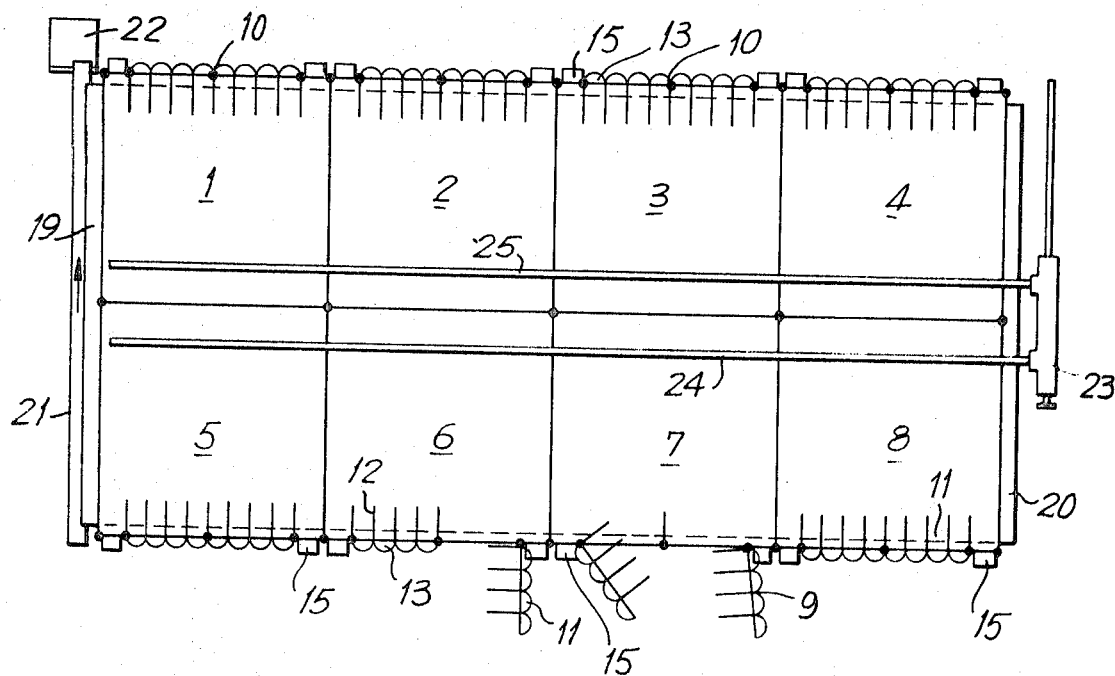
FIG. 1 shows a horizontal projection of a battery according to the structural motif of this invention.

The embodiment of the battery, as disclosed, is composed of eight sections approximately of square shape, whose more suitable dimensions varies approximately from 2.00 meters per 2.00 meters and is provided with its coupled bases and its front sides at two opposed sides.

Each section aforesaid is composed of opaque sides, preferably of metal sheets, in such a way that the sides of one serve at the same time to conform the other adjacent wall or side, constituting thus the individual sections indicated by reference numerals 1 to 8. The sides facing the exterior are provided with doors so that when opened they leave all the front sides accessible for the easy placing and withdrawal of the birds.

If, as in the case of the illustrated instance, it is desired that doors 9 with two leads be provided for each section, it is practical to dispose a central piller for each two sections as shown by reference numeral 10.

Each door is provided to establish partitioned conforming pens 11 and it is not necessary for such partitions 12 to extend beyond a relatively low height, that is only the necessary normal height of the birds to prevent the birds from disturbing one another.

Figure 2:
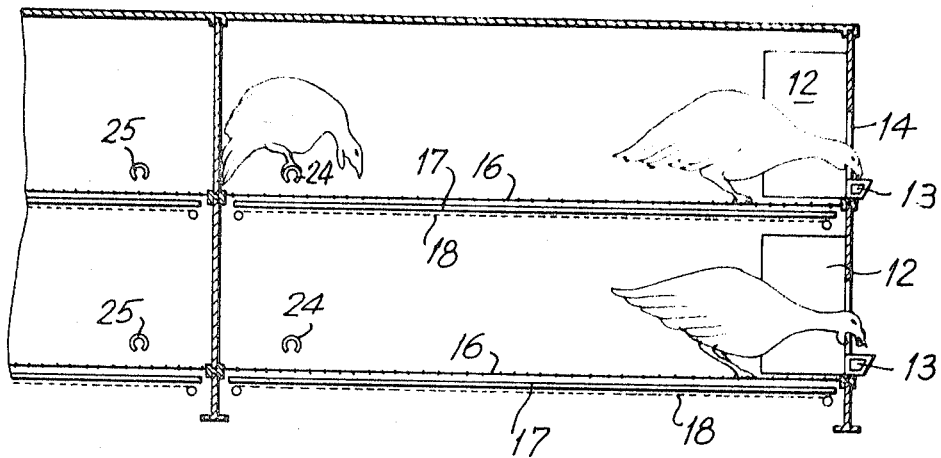
FIG. 2 is a vertical cross section of the showing of FIG. 1 in slightly increased scale.

To each pen 11 there is provided a corresponding feeding receptacle 13 placed under a small window 14, such as is illustrated at FIG. 2. Moreover, the fixed pens 11 are each provided with their corresponding windows and drinking troughs 15, preferably placed at the corners of the section 1 to 8.

The above-mentioned dimensioned arrangement for the respective sections are the most convenient for accommodating 12 birds for each section, it thus being possible to dispose the same in multiples of several floors, preferably at least two stories in order to facilitate the task of the personnel for introducing and withdrawing therein and therefrom the birds being accommodated for feeding.

The floor of the respective sections 1 to 8 are of wire mesh of an artistic type, i.e., of square mesh 16, preferably of 2-3 centimeters in mesh spacing, thus providing a favorable condition for the evacuation of the bird droppings, and the birds will normally push down the residue through the wire mesh 16 while stepping thereon.

At a level immediately under the wire mesh floor 16 there is a wide movable rubber conveyor belt 17 sliding over a wire mesh 18 and turning round limiting rolls located in the 19 and 20 areas of FIG. 1, the conveyor belt 17 being impelled by manual or mechanical means in order to transfer the droppings which have been pushed through the floor 16 towards a collection gutter 21 by the action of an appropriate scraping blade. Such residues are collected from said gutter in containers especially appropriated for that purpose.

The warmed atmosphere of the interior of the sections controlled as to ambient temperatures is obtained by an air conditioning installation which leading from a source 23 includes distribution tubes 24 and 25 with outlets drilled in the lower part (see FIG. 2) in order to avoid obstructions caused by the droppings.

These warm tubes serve at the same time as the usual and appropriate supporting bars for the turkeys to allow them to sleep or rest thereon.

It is preferable for drinking troughs 15 in the pens 11 to be placed at fixed parts of the sections forming the same to avoid water spilling, while the feeding troughs can be satisfactorily distributed and attached on opening parts of each of the sections 1-8, such as doors 9, therefore providing less possibility of spilling. Such would be the case by installing doors 9 with vertical axes of opening, although there would be no objections if the doors are opened by rotation thereof around the horizontal axes, in which case it is probable that a minimum spilling of food could result, but this generally is not considered an important problem.

Other fundamental structural details of this invention reside in providing wide openings to make the handling of the birds more easy, easily washable floors which do not retain the droppings and most important the pens for feeding and drinking troughs are maintained with the inner atmosphere being warm and dark.

Doors with varying partitioned conforming pens may be interchangeably utilized, in order to provide different types thereof for the purpose of increasing the variety of utilization to take advantage of the present invention for breeding of birds of different kinds, sizes and species, as differentiated from the turkeys discussed in the described embodiment.

What is claimed is:

1. Cages for the housing and fattening of fowl each cage comprising upstanding opaque rear and sidewalls, an opaque top wall, a mesh bottom wall and a front wall comprising at least one openable door having a plurality of holes therein of a size such and at a height such as to be suitable for passage of a fowl head and neck therethrough, and the distance between said holes corresponding to the breadth of fowl intended to be housed in said cages said door being opaque except for said holes, vertical partitions mounted on the interior of said door between adjacent holes, thereby forming a plurality of stalls for reception of individual fowl, and feed receptacles mounted on the exterior of said door below said holes at a height such as to be reachable by fowls through said holes.

2. Cages as defined in claim 1, wherein said door is readily removable to permit replacement with a door having holes and stalls of dimensions suitable for fowl of another size.

3. Cages as defined in claim 1, wherein said front wall has a stationary section, said section having a hole therein appropriately placed and of appropriate size for passage of a fowl head and neck therethrough, said section further having a water trough thereon, reachable by a fowl through said hole.

4. Cages as defined in claim 1, wherein at least one upstanding wall of each cage serves as a common wall between two cages.

5. Cages as defined in claim 1, wherein a conveyor belt is mounted below said mesh bottom walls for collecting and removing droppings passing therethrough, and each cage has therein a horizontal tube supported above said floor at a height and of a diameter such that it is suitable as a perch, each tube having perforations in the lower portion thereof and being supplied with conditioned air.